United States Patent
Querejeta et al.

(10) Patent No.: US 11,532,236 B2
(45) Date of Patent: Dec. 20, 2022

(54) METHOD AND SYSTEM FOR POLICY-BASED TRAFFIC ENCOUNTER ASSESSMENT TO DETECT AND AVOID TRAFFIC

(71) Applicant: The Boeing Company, Chicago, IL (US)

(72) Inventors: Carlos Querejeta, Madrid (ES); Enrique Casado, Madrid (ES); Ernesto Valls Hernández, Madrid (ES); Jesus Cuadrado Sánchez, Madrid (ES)

(73) Assignee: The Boeing Company, Chicago, IL (US)

( * ) Notice: Subject to any disclaimer, the term of this patent is extended or adjusted under 35 U.S.C. 154(b) by 157 days.

(21) Appl. No.: 17/003,239

(22) Filed: Aug. 26, 2020

(65) Prior Publication Data

US 2021/0118308 A1 Apr. 22, 2021

(30) Foreign Application Priority Data

Oct. 17, 2019 (EP) .................................... 19382908

(51) Int. Cl.
*G08G 5/00* (2006.01)
*G08G 5/04* (2006.01)

(52) U.S. Cl.
CPC ............ *G08G 5/006* (2013.01); *G08G 5/003* (2013.01); *G08G 5/0013* (2013.01); *G08G 5/045* (2013.01)

(58) Field of Classification Search
CPC ...... G08G 5/006; G08G 5/0013; G08G 5/003; G08G 5/045
See application file for complete search history.

(56) References Cited

U.S. PATENT DOCUMENTS

| 8,019,529 B1 * | 9/2011 | Sharma | G08G 5/06 701/117 |
| 10,041,809 B2 | 8/2018 | Navarro et al. | |
| 2012/0303252 A1 | 11/2012 | Schwinn et al. | |

(Continued)

FOREIGN PATENT DOCUMENTS

WO WO-2022063520 A1 * 3/2022

OTHER PUBLICATIONS

Extended European Search Report dated May 7, 2020 for European Patent Application No. 19382908.2, 8 pages.

*Primary Examiner* — Frederick M Brushaber
*Assistant Examiner* — Elizabeth Yang
(74) *Attorney, Agent, or Firm* — Sage Patent Group

(57) ABSTRACT

A method for policy-based traffic encounter assessment to detect and avoid traffic includes determining, by a processor, an ownship predicted trajectory of an aircraft. The aircraft is the ownship. The method also includes determining a traffic predicted trajectory of one or more other aircraft in the vicinity of the ownship. The one or more other aircraft includes traffic. The method also includes assessing an encounter between the ownship and the traffic, wherein assessing the encounter between the ownship and the traffic includes applying an encounter assessment policy to the traffic predicted trajectory and the ownship predicted trajectory. The method further includes generating encounter assessment data in response to assessing the encounter between the ownship and the traffic. The encounter assessment data is used to at least detect and avoid the traffic by the ownship.

20 Claims, 16 Drawing Sheets

(56) References Cited

U.S. PATENT DOCUMENTS

| | | | |
|---|---|---|---|
| 2015/0251756 A1* | 9/2015 | Perez Villar | G05D 1/0808 |
| | | | 701/4 |
| 2017/0337829 A1* | 11/2017 | Brandao | G08G 5/0021 |
| 2018/0366012 A1 | 12/2018 | Glatfelter | |
| 2019/0266904 A1* | 8/2019 | Kant | G08G 5/0013 |

* cited by examiner

METHOD AND SYSTEM FOR POLICY-BASED TRAFFIC ENCOUNTER ASSESSMENT TO DETECT AND AVOID TRAFFIC

CROSS-REFERENCE TO RELATED APPLICATIONS

The present application claims benefit of priority to European Patent Application No. 19382908.2, filed Oct. 17, 2019, and is assigned to the same assignee as the present application and is incorporated herein by reference.

FIELD

The present disclosure relates to detection and avoidance of traffic or other aircraft and more particularly to a method and system for policy-based traffic encounter assessment to detect and avoid the traffic or other aircraft.

BACKGROUND

The operation of aircraft in the future is expected to be conducted with a high degree of autonomy. In this context, technologies which enable substantially complete autonomous operation will be key. Detect and avoid is a key capability to integrate Remotely Piloted Aircraft Systems (RPAS) in an airspace. A detect and avoid system essentially provides the capability to detect other aircraft or traffic in an airspace and to take appropriate actions to address potential conflicts and continue operation. Detect and avoid capability is considered critical for autonomous operation of aircraft and a key requirement for such operation in an airspace. Current detect and avoid systems employ simplistic and rudimentary methods for predicting trajectory of other aircraft. Additionally, detection and avoidance can be exacerbated when an ownship and other aircraft in an airspace are maneuvering and moving at speeds that are not constant. Accordingly, there is a need for a method and system to detect and avoid other aircraft or traffic which is not subject to these disadvantages.

SUMMARY

In accordance with an example, a method for policy-based traffic encounter assessment to detect and avoid traffic includes determining, by a processor, an ownship predicted trajectory of an aircraft. The aircraft being the ownship. The method also includes determining a traffic predicted trajectory of one or more other aircraft in a vicinity of the ownship. The one or more other aircraft including traffic. The method also includes assessing an encounter between the ownship and the traffic, wherein assessing the encounter between the ownship and the traffic includes applying an encounter assessment policy to the traffic predicted trajectory and the ownship predicted trajectory. The method further includes generating encounter assessment data in response to assessing the encounter between the ownship and the traffic. The encounter assessment data is used to at least detect and avoid the traffic by the ownship.

In accordance with another example, a system for policy-based traffic encounter assessment to detect and avoid traffic includes a processor and a memory associated with the processor. The memory includes computer-readable program instructions that, when executed by the processor causes the processor to perform a set of functions. The set of functions include determining an ownship predicted trajectory of an aircraft, the aircraft being the ownship. The set of functions also including determining a traffic predicted trajectory of one or more other aircraft in a vicinity of the ownship. The one or more other aircraft including traffic. The set of functions also including assessing an encounter between the ownship and the traffic, wherein assessing the encounter between the ownship and the traffic includes applying an encounter assessment policy to the traffic predicted trajectory and the ownship predicted trajectory. The set of functions also include generating encounter assessment data in response to assessing the encounter between the ownship and the traffic. The encounter assessment data is used to at least detect and avoid the traffic by the ownship.

In accordance with a further example, an aircraft includes a system for policy-based traffic encounter assessment to detect and avoid traffic. The system includes a processor and a memory associated with the processor. The memory includes computer-readable program instructions that, when executed by the processor causes the processor to perform a set of functions. The set of functions include determining an ownship predicted trajectory of the aircraft, the aircraft being the ownship. The set of functions also include determining a traffic predicted trajectory of one or more other aircraft in a vicinity of the ownship. The one or more other aircraft including traffic. The set of functions also include assessing an encounter between the ownship and the traffic, wherein assessing the encounter between the ownship and the traffic includes applying an encounter assessment policy to the traffic predicted trajectory and the ownship predicted trajectory. The set of functions also include generating encounter assessment data in response to assessing the encounter between the ownship and the traffic. The encounter assessment data is used to at least detect and avoid the traffic by the ownship.

In accordance with an example and any of the preceding examples, wherein determining the traffic predicted trajectory includes predicting a trajectory of the traffic as a sequence of timely ordered predicted traffic state vectors.

In accordance with an example and any of the preceding examples, wherein determining the traffic predicted trajectory includes using a processed traffic track and any available enhancement by a traffic trajectory prediction module to generate the traffic predicted trajectory.

In accordance with an example and any of the preceding examples, wherein the method and set of function, further include generating the processed traffic track by a traffic track processor from traffic track data. The traffic track processor is configured to determine a relative position between the ownship and the traffic and to analyze a history of a plurality of traffic tracks to determine maneuvering patterns of the traffic. Traffic maneuver data is generated by the traffic track processor from the maneuvering patterns of the traffic.

In accordance with an example and any of the preceding examples, wherein the method and set of functions further include generating the traffic track data and any traffic intent data by a traffic detection module using at least one of traffic state information, Automatic Dependent Surveillance Broadcast (ADS-B) reports, Traffic Information Service Broadcast (TIS-B) reports, shared flight plans of the traffic and ownship, and a mission description of the traffic.

In accordance with an example and any of the preceding examples, wherein determining the traffic predicted trajectory includes determining any enhancement to the traffic predicted trajectory for application to the traffic predicted trajectory.

In accordance with an example and any of the preceding examples, wherein determining the traffic predicted trajectory includes determining the traffic predicted trajectory enhanced by traffic intent data.

In accordance with an example and any of the preceding examples, wherein the method and set of functions further include translating the traffic intent data into constraints that are met during a traffic trajectory prediction process.

In accordance with an example and any of the preceding examples, wherein the method and set of functions further include determining the traffic intent data by a traffic detection module using at least one of traffic state information, Automatic Dependent Surveillance Broadcast (ADS-B) reports, Traffic Information Service Broadcast (TIS-B) reports, shared flight plans of the traffic and ownship, and a mission description of the traffic.

In accordance with an example and any of the preceding examples, wherein determining the traffic predicted trajectory includes determining the traffic predicted trajectory enhanced by traffic maneuver data.

In accordance with an example and any of the preceding examples, wherein determining the traffic predicted trajectory enhanced by traffic maneuver data includes predicting a collision course traffic trajectory using a processed traffic track, an ownship predicted trajectory and the traffic maneuver data.

In accordance with an example and any of the preceding examples, wherein the encounter assessment data is defined by the encounter assessment policy, and contents of particular encounter assessment data is based on one or more requirements of a client system that receives the particular encounter assessment data.

In accordance with an example and any of the preceding examples, wherein determining the ownship predicted trajectory includes using an ownship state, an ownship intent and an ownship performance model.

In accordance with an example and any of the preceding examples, wherein assessing the encounter between the ownship and the traffic includes evaluating a traffic protection area for each other aircraft in the vicinity of the ownship by applying a defined traffic protection area to the traffic predicted trajectory of each other aircraft in the vicinity of the ownship; computing encounter parameters defined in encounter metrics of the encounter assessment policy to evaluate alert levels for each traffic protection area; evaluating if and when each traffic protection area will be violated and an associated alert level; checking an alert triggering condition for each traffic protection area to tag the encounter with an alert having an appropriate alert level; and tagging the encounter with the alert having the appropriate alert level in response to an associated traffic protection area being violated.

The features, functions, and advantages that have been discussed can be achieved independently in various examples or may be combined in yet other examples further details of which can be seen with reference to the following description and drawings.

DETAILED DESCRIPTION

Figure 1:
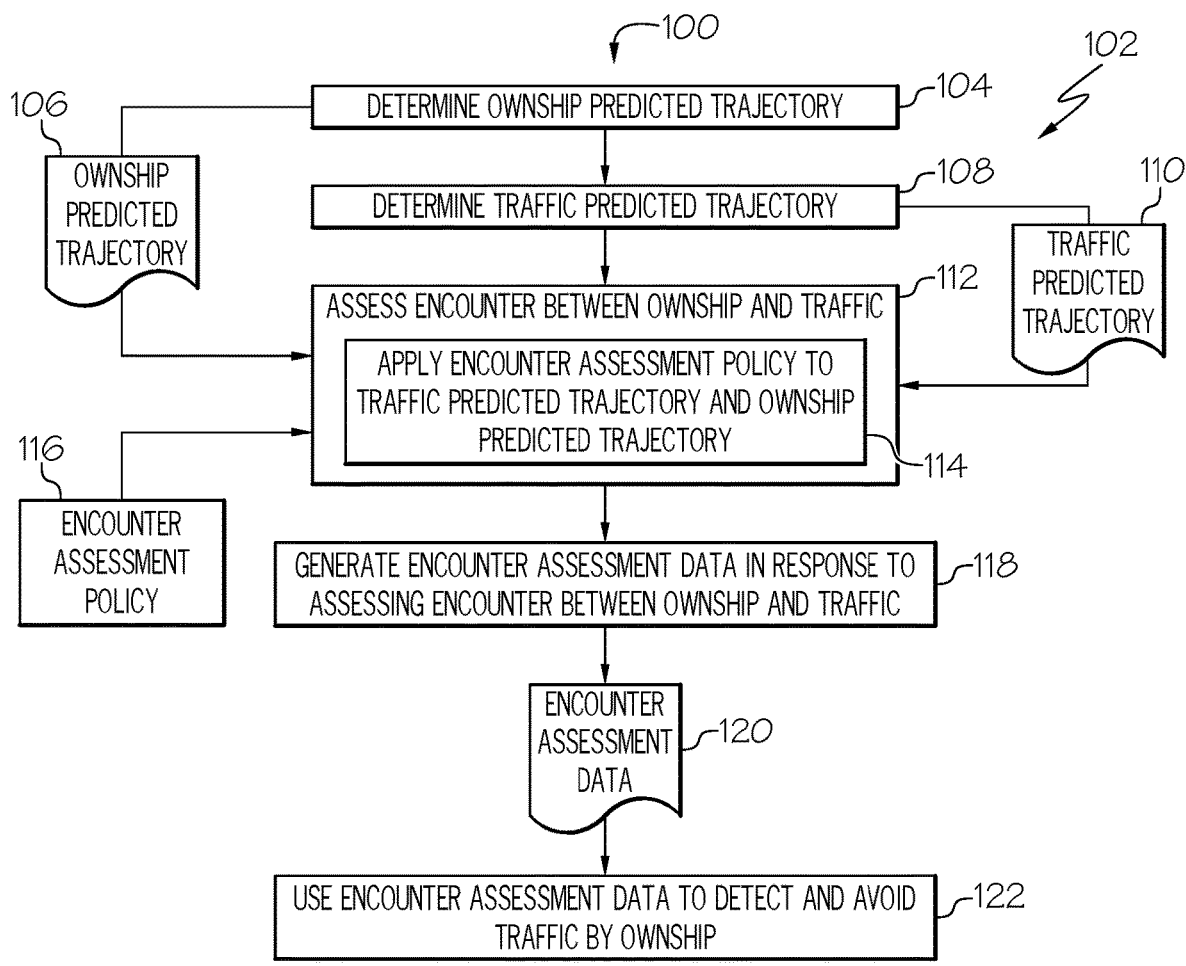
FIG. 1 is a flow chart of an example of a method for policy-based traffic encounter assessment to detect and avoid traffic in accordance with an example of the present disclosure.

The following detailed description of examples refers to the accompanying drawings, which illustrate specific examples of the disclosure. Other examples having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 3:
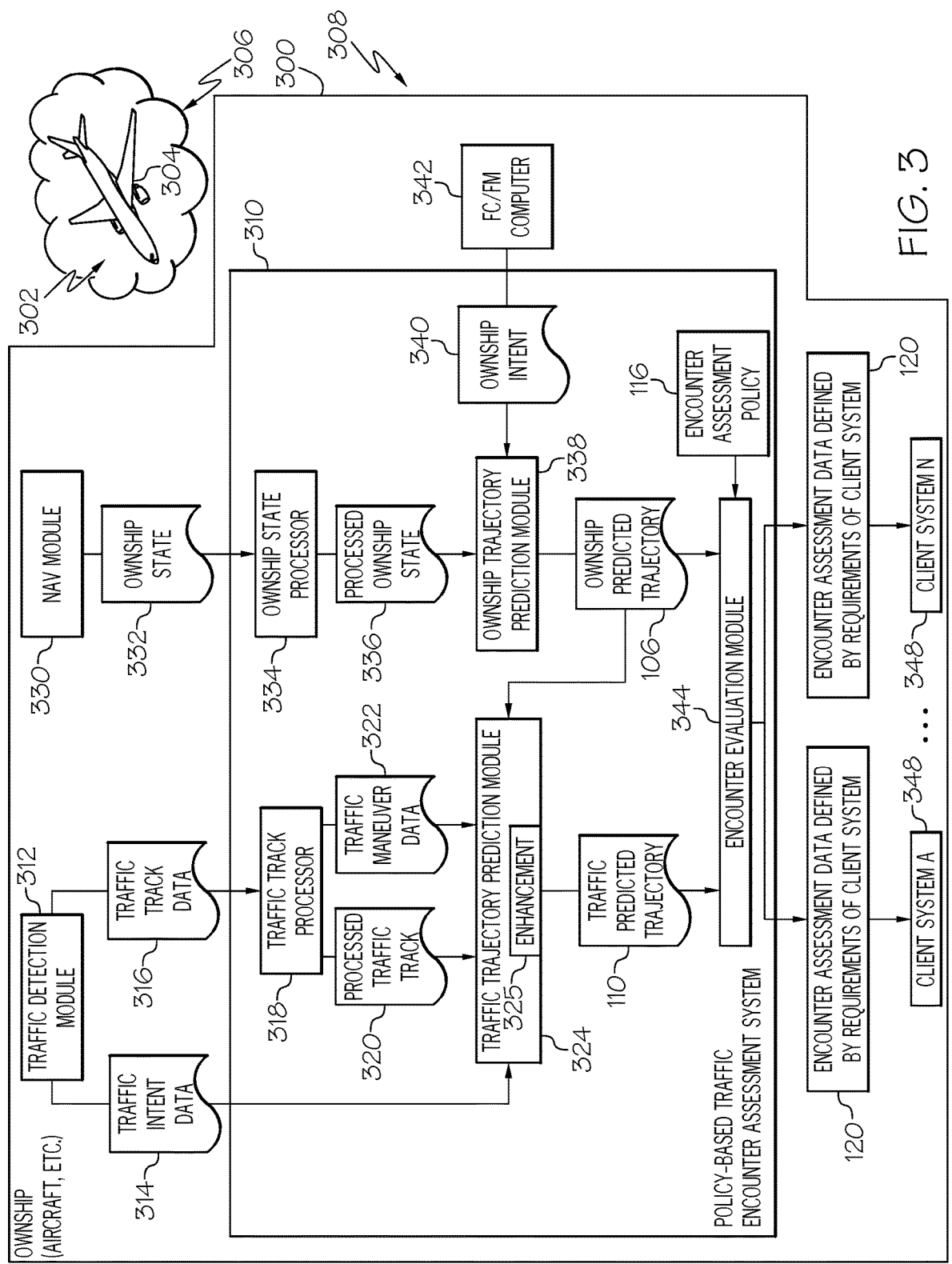
FIG. 3 is a block schematic diagram of an example of an ownship including a policy-based traffic encounter assessment system to detect and avoid traffic in accordance with an example of the present disclosure.

FIG. 1 is a flow chart of an example of a method 100 for policy-based traffic encounter assessment 102 to detect and avoid traffic 302 (FIG. 3) in accordance with an example of the present disclosure. As illustrated in FIG. 3, traffic 302 is defined as one or more other aircraft 304 in a proximate airspace or preset vicinity 306 of an ownship 300. In block 104, an ownship predicted trajectory 106 of an aircraft, such as aircraft 308 in FIG. 3 is determined. An example of determining the ownship predicted trajectory 106 will be described in more detail with reference to FIG. 8. The aircraft 308 is also referred to as the ownship 300. An example of the ownship 300 or aircraft 308 including an exemplary policy-based traffic encounter assessment system 310 will be described in more detail with reference to FIG. 3. In accordance with an example, the method 100 is embodied in and performed by the policy-based traffic encounter assessment system 310.

In block 108, a traffic predicted trajectory 110 of one or more other aircraft 304 (FIG. 3) in the preset vicinity 306 of the ownship 300 is determined. An example of a method 600 for determining the traffic predicted trajectory 110 will be described in more detail with reference to FIGS. 6A-6C.

In block 112, an encounter 1004 (FIG. 10) between the ownship 300 and the traffic 302 is assessed. Assessing the encounter 1004 between the ownship 300 and the traffic 302 includes applying 114 an encounter assessment policy 116 to the traffic predicted trajectory 110 and the ownship predicted trajectory 106. An example of a method 900 for assessing the encounter 1004 between the ownship 300 and the traffic 302 will be described in more detail with reference to FIG. 9A.

In block 118, encounter assessment data 120 is generated in response to assessing the encounter 1004 between the ownship 300 and the traffic 302 in block 112. In block 122, the encounter assessment data 120 is used to at least detect and avoid the traffic 302 by the ownship 300.

Figure 2:
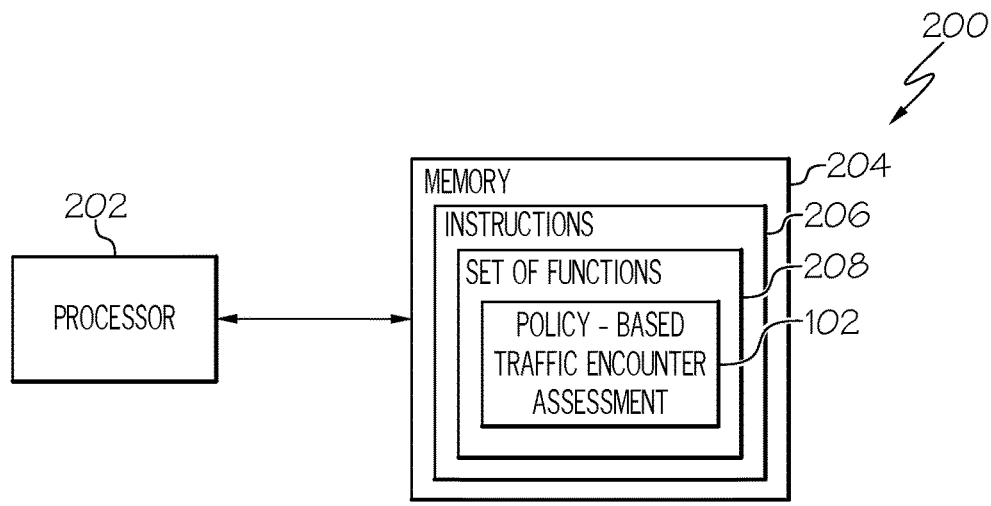
FIG. 2 is a block schematic diagram of an example of a system for policy-based traffic encounter assessment to detect and avoid traffic in accordance with an example of the present disclosure.

FIG. 2 is a block schematic diagram of an example of a system 200 for policy-based traffic encounter assessment 102 to detect and avoid traffic 302 (FIG. 3) in accordance with an example of the present disclosure. In accordance with an example, the method 100 is embodied in and performed by the system 200. A more detailed example of the system 200 is the policy-based traffic encounter assessment system 310 which will be described with reference to FIG. 3.

The system 200 includes a processor 202 and a memory 204 associated with the processor 202. The memory 204 includes computer-readable program instructions 206 that, when executed by the processor 202 cause the processor 202 to perform a set of functions 208. In accordance with the example in FIG. 2, the set of functions 208 include the policy-based traffic encounter assessment 102 embodied in the method 100.

Figure 4:
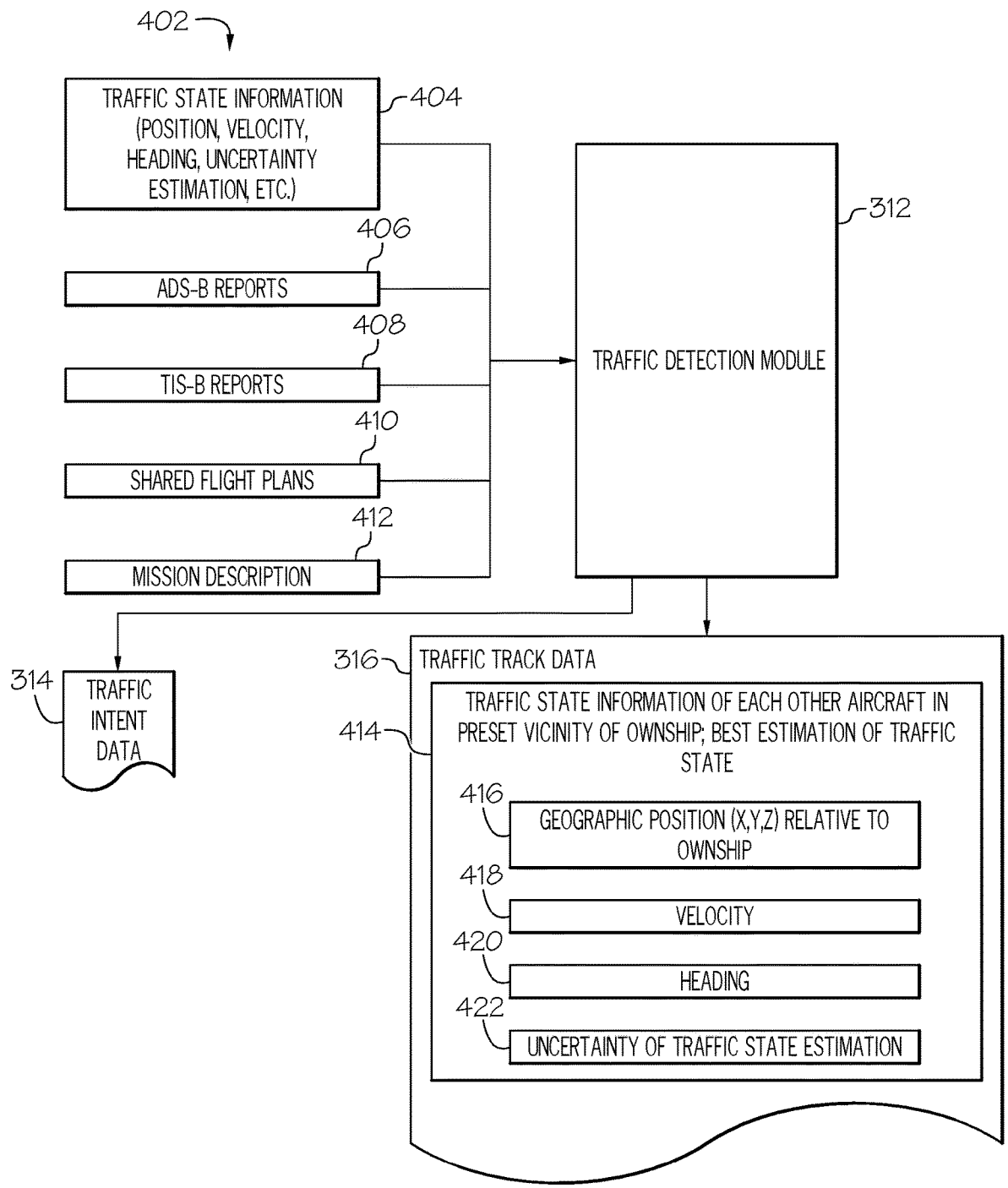
FIG. 4 illustrates examples of inputs to a traffic detection module configured to generate traffic intent data and traffic track data in accordance with an example of the present disclosure.

FIG. 3 is a block schematic diagram of an example of an ownship 300 including a policy-based traffic encounter assessment system 310 to detect and avoid traffic 302 in accordance with an example of the present disclosure. The ownship 300 includes a traffic detection module 312 configured to generate traffic intent data 314 and traffic track data 316. Referring also to FIG. 4, FIG. 4 illustrates examples of inputs 402 to a traffic detection module 312 configured to generate traffic intent data 314 and traffic track data 316 in accordance with an example of the present disclosure. Examples of the inputs 402 include but are not necessarily limited to traffic state information 404, Automatic Dependent Surveillance Broadcast (ADS-B) reports 406, Traffic Information Service Broadcast (TIS-B) reports 408, shared flight plans 410 of the traffic 302 and ownship 300, and a mission description 412 of the traffic 302. The traffic detection module 312 determines any traffic intent data 314 and the traffic track data 316 by using at least one of the traffic state information 404, ADS-B reports 406, TIS-B reports 408, shared flight plans 410 of the traffic 302 and ownship 300, and a mission description 412 of the traffic 302. Examples of the traffic state information include but are not necessarily limited to a position or geographic location of the traffic 302 (e.g., each other aircraft 304 in the preset vicinity 306 of the ownship 300, an altitude, velocity, heading, etc., and uncertainty estimations of any of these parameters associated with the traffic 302).

The traffic track data 316 generated by the traffic detection module 312 using the inputs 402 includes traffic state information 414 of each other aircraft 304 in a preset vicinity 306 of the ownship 300. Under some circumstances, the traffic state information 414 is a best estimate of the traffic state. Examples of the traffic state information 414 include but is not necessarily limited to a geographic position 416 including altitude of the traffic 302 (e.g., other aircraft 304, relative to the ownship 300, velocity 418, heading 420 of the traffic 302 and an uncertainty of the traffic state estimation 422 associated with each other aircraft 304).

Figure 5:
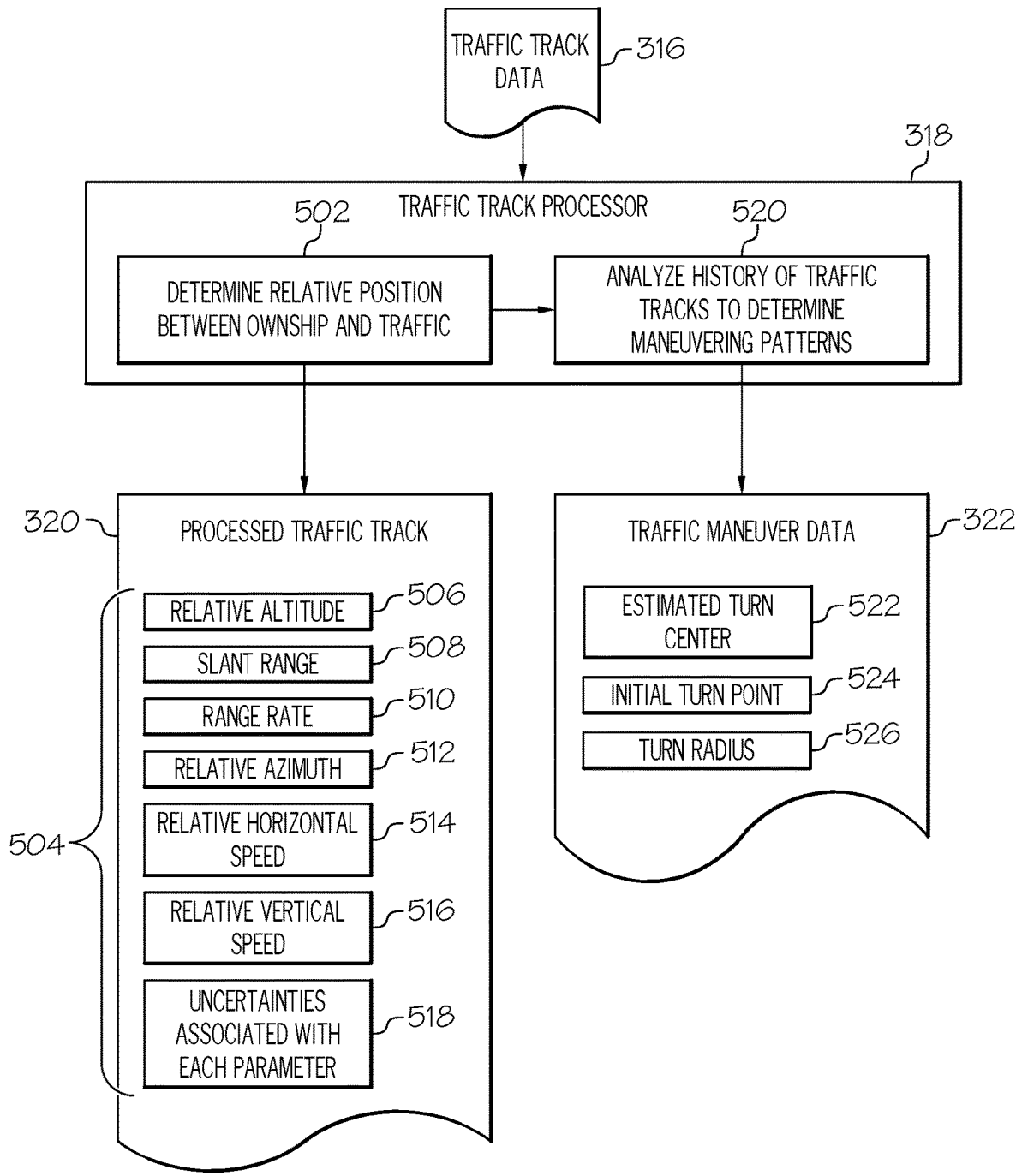
FIG. 5 is an example of a traffic track processor configured to generate a processed traffic track and traffic maneuver data using traffic track data in accordance with an example of the present disclosure.

Referring back to FIG. 3, the policy-based traffic encounter assessment system 310 includes a traffic track processor 318. The traffic track processor 318 is configured to generate a processed traffic track 320 and traffic maneuver data 322 using the traffic track data 316. Referring also to FIG. 5, FIG. 5 is an example of a traffic track processor 318 configured to generate a processed traffic track 320 and traffic maneuver data 322 using the traffic track data 316 in accordance with an example of the present disclosure. The traffic track processor 318 is configured to determine a relative position between the ownship 300 and the traffic 302 from the traffic track data 316 in block 502 and to generate the processed traffic track 320. The processed traffic track 320 includes a set of data 504 associated with the traffic 302 or one or more other aircraft 304. The set of data 504 includes but is not necessarily limited to a relative altitude 506 of the traffic 302 relative to the ownship 300; a slant range 508 from the ownship 300 to the traffic 302; a range rate 510 of the traffic 302; a relative azimuth 512 from the ownship 300 to the traffic 302; a relative horizontal speed 514 of the traffic 302; a relative vertical speed 516 of the traffic 302; and uncertainties 518 associated with each of the foregoing parameters.

The traffic track processor 318 is also configured to analyze a history of a plurality of traffic tracks to determine maneuvering patterns of the traffic 302 in block 520. The traffic maneuver data 322 is generated by the traffic track processor 318 analyzing the history of traffic tracks to determine maneuvering patterns of the traffic 302. The traffic maneuver data 322 is generated by the traffic track processor 318 from the maneuvering patterns of the traffic 302. The traffic maneuver data 322 includes but is not necessarily limited to an estimated turn center 522, an initial turn point 524, and a turn radius 526.

Figure 6A:
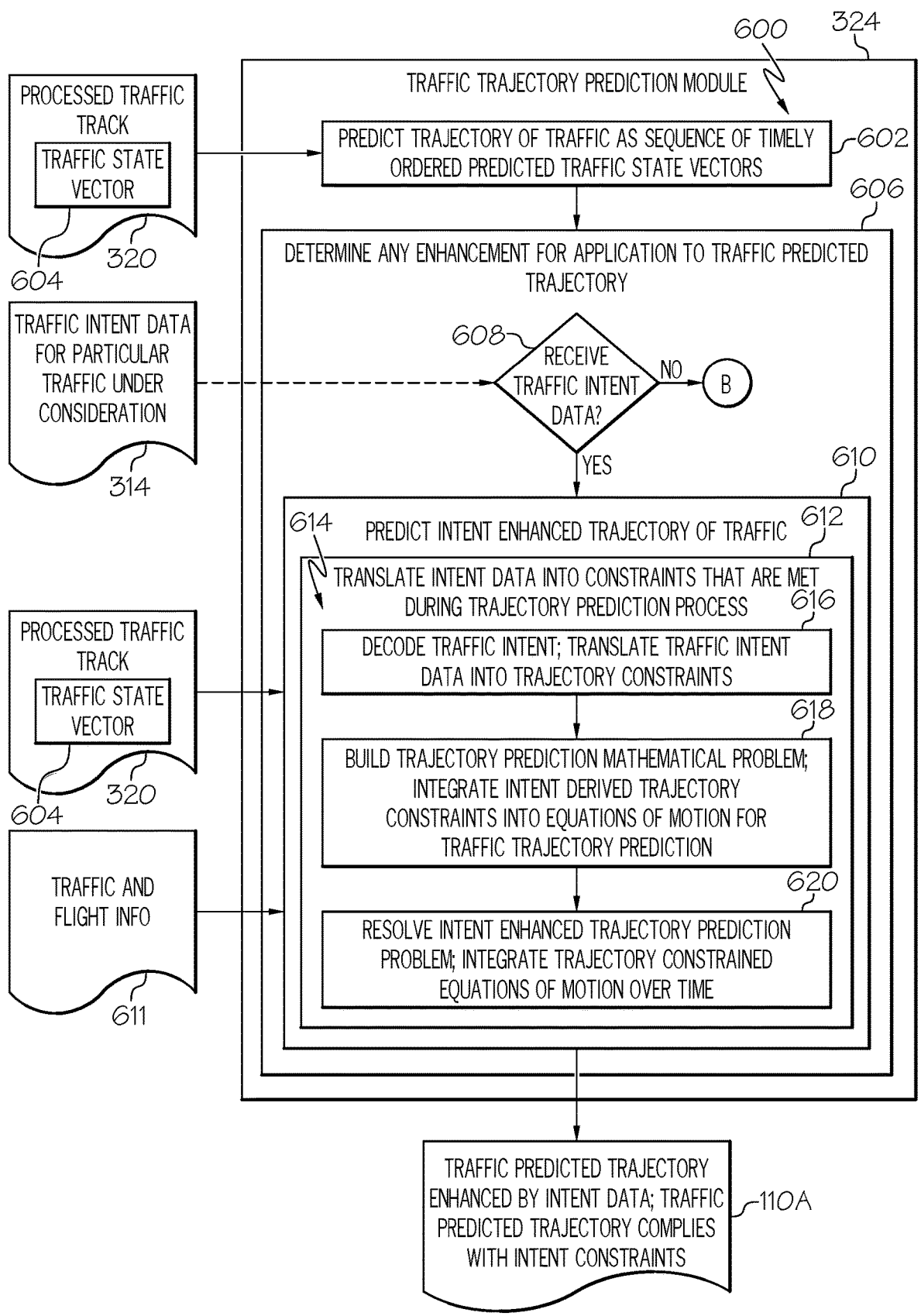
FIGS. 6A-6C are an example of a traffic trajectory prediction module configured to generate a traffic predicted trajectory in accordance with an example of the present disclosure.
Figure 6B:
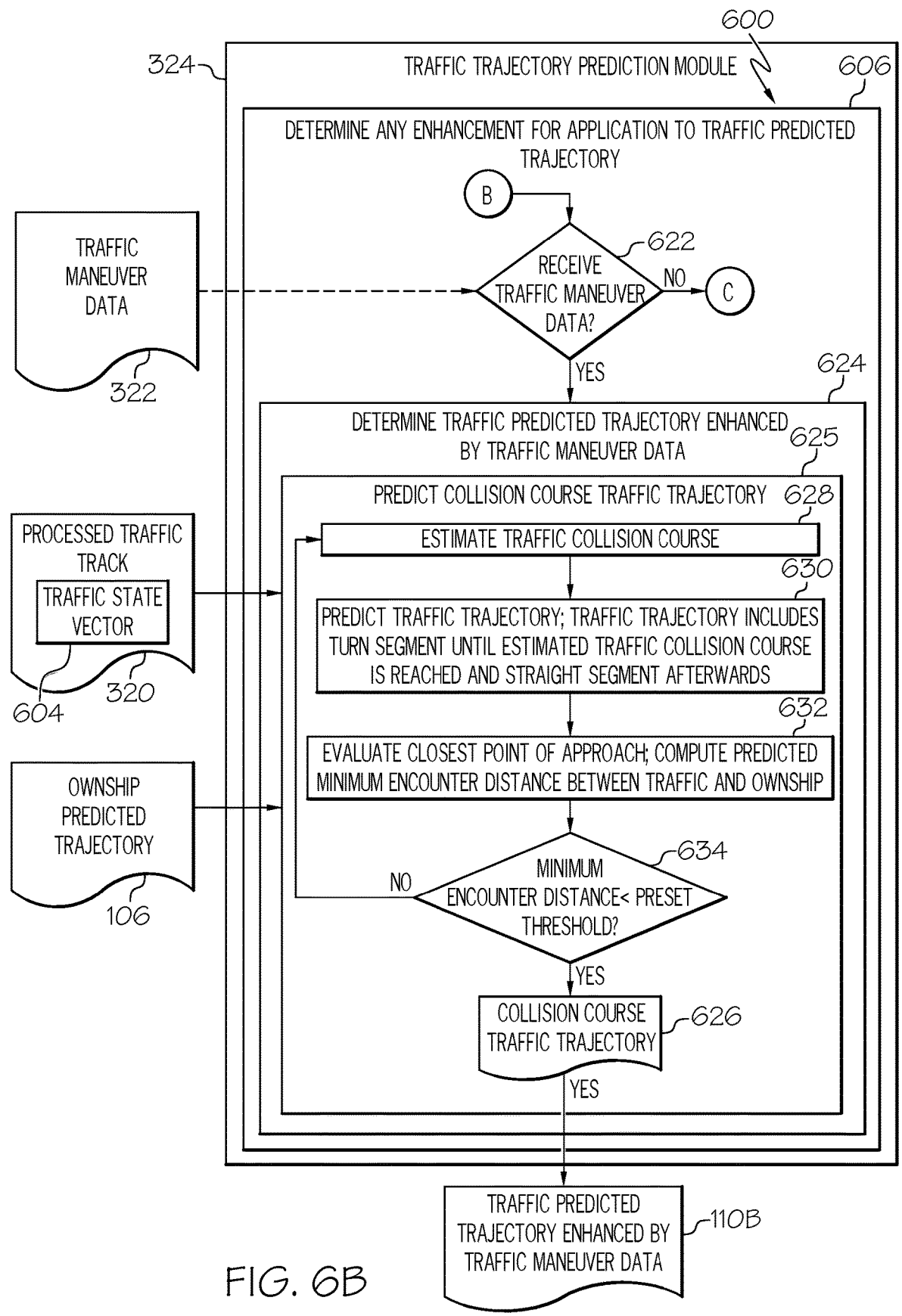
Figure 6C:
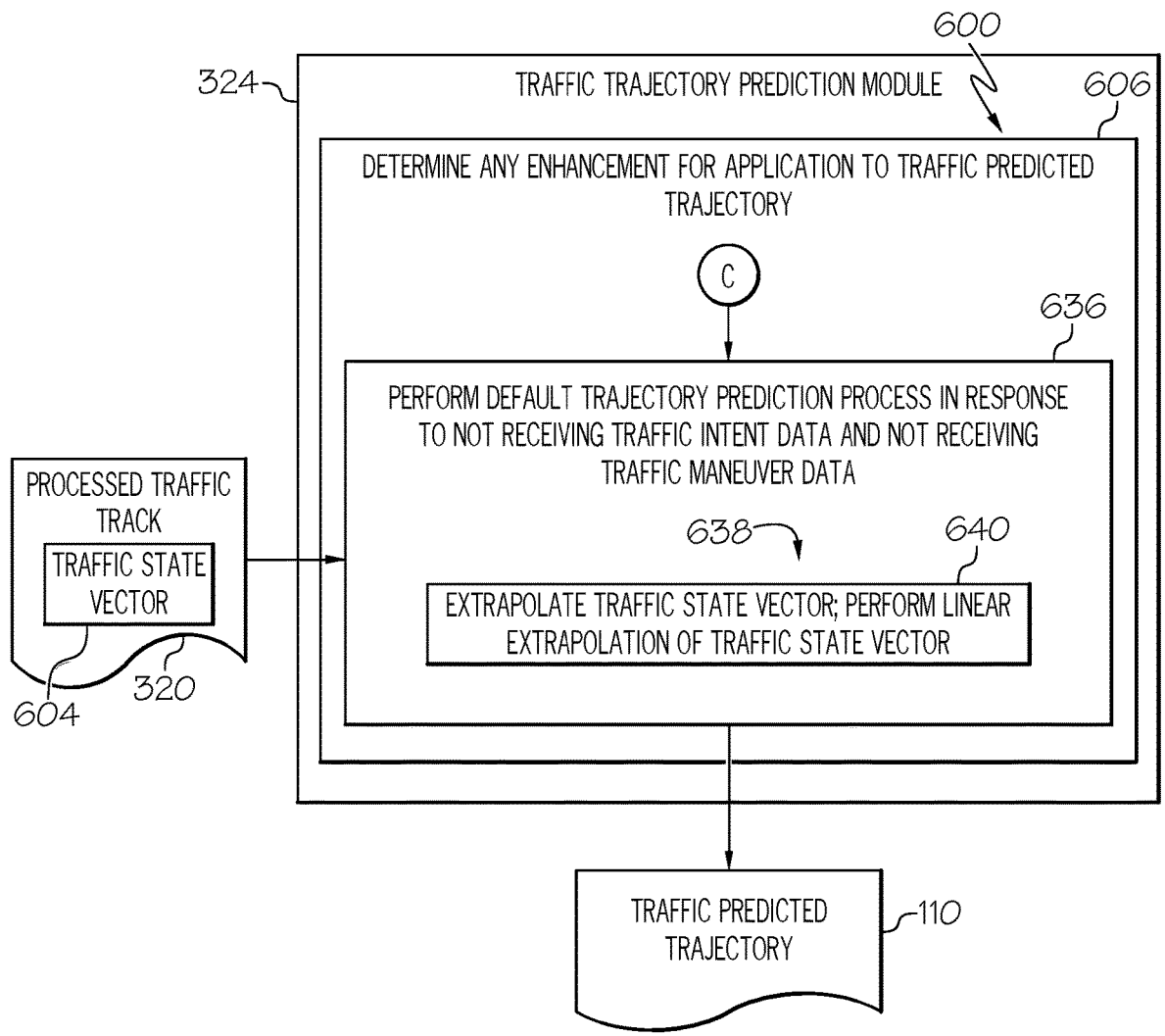

Referring back to FIG. 3, the policy-based traffic encounter assessment system 310 also includes a traffic trajectory prediction module 324. The traffic trajectory prediction module 324 is configured to generate a traffic predicted trajectory 110 using at least the traffic intent data 314, the processed traffic track 320 or the traffic maneuver data 322. Referring also to FIGS. 6A-6C, FIGS. 6A-6C are an example of a traffic trajectory prediction module 324 configured to generate a traffic predicted trajectory 110 in accordance with an example of the present disclosure. In accordance with an example, a method 600 for determining a traffic predicted trajectory 110 is embodied in and performed by the traffic trajectory prediction module 324. In block 602, determining the traffic predicted trajectory 110 includes predicting a trajectory of the traffic 302 as a sequence of timely ordered predicted traffic state vectors 604. The set of data 504 of the processed traffic track 320 defines a set of traffic state vectors 604.

In accordance with an example, determining the traffic predicted trajectory 110 includes using the processed traffic track 320 and any available enhancement 325 (FIG. 3) by the traffic trajectory prediction module 324 to generate the traffic predicted trajectory 110. In block 606 of FIG. 6A, determining the traffic predicted trajectory 110 includes determining any enhancement 325 to the traffic predicted trajectory 110 for application to the traffic predicted trajectory 110.

In block 608, a determination is made whether any traffic intent data 314 has been received by the traffic trajectory prediction module 324. The method 600 advances to block 610 in response to traffic intent data 314 for a particular traffic 302 under consideration being received by the traffic trajectory prediction module 324. In block 610, determining the traffic predicted trajectory 110 includes determining the traffic predicted trajectory 110 enhanced by traffic intent data 314. The traffic predicted trajectory 110 enhanced by traffic intent data 314 is determined using the traffic intent data 314, the processed traffic track 320 and traffic and flight information 611.

In block 612, determining the traffic predicted trajectory 110 enhanced by the traffic intent data 314 includes translating the traffic intent data 314 into constraints that are met during a traffic trajectory prediction process 614.

In block 616, the traffic intent data 314 is decoded. In accordance with an example, the traffic intent data 314 is decoded or translated into trajectory constraints. In block 618, a trajectory prediction mathematical problem is built. Intent derived trajectory constraints are integrated into equations of motion for traffic trajectory prediction.

In block 620, the intent enhanced trajectory prediction problem is resolved. Trajectory constrained equations of motion over time are integrated to generate a traffic predicted trajectory 110A enhanced by the traffic intent data 314. The traffic predicted trajectory 110A enhanced by the traffic intent data 314 complies with the intent constrains.

Returning to block 608, if traffic intent data 314 is not received by the traffic trajectory prediction module 324, the method 600 advances to block 622 in FIG. 6B. In block 622, a determination is made by the traffic trajectory prediction module 324 if traffic maneuver data 322 was received by the traffic trajectory prediction module 324. If traffic maneuver data 322 was received by the traffic trajectory prediction module 324, the method 600 advances to block 624. In block 624, determining the traffic predicted trajectory 110 includes determining the traffic predicted trajectory 110B enhanced by traffic maneuver data 322.

In block 625, determining the traffic predicted trajectory 110B enhanced by the traffic maneuver data 322 includes predicting a collision course traffic trajectory 626. In accordance with an example, the collision course traffic trajectory 626 is predicted by the traffic trajectory prediction module 324 using the traffic maneuver data 322, the processed traffic track 320 and an ownship predicted trajectory 106.

In block 628, predicting the collision course traffic trajectory 626 includes estimating a traffic collision course. In block 630, a traffic trajectory is predicted. The predicted traffic trajectory includes a turn segment until the estimated traffic collision course is reached and includes straight segments thereafter.

In block 632, predicting the collision course traffic trajectory 626 includes evaluating a closest point of approach. A predicted minimum encounter distance is computed between the traffic 302 and the ownship 300.

In block 634, a determination is made whether the predicted minimum encounter distance is less than a preset threshold. If the predicted minimum encounter distance is not less than the preset threshold, the method 600 returns to block 628 and the method 600 continues as previously described. If the predicted minimum encounter distance is less than the preset threshold in block 634, the predicted traffic trajectory in block 630 corresponds to the collision course traffic trajectory 626. The collision course traffic trajectory 626 corresponds to the traffic predicted trajectory 1108 enhanced by the traffic maneuver data 322.

Returning to block 622, if traffic maneuver data 322 is not received by the traffic trajectory prediction module 324 in block 622, the method 600 advances to block 636 in FIG. 6C. In block 636, a default trajectory prediction process 638 is performed in response to the traffic trajectory prediction module 324 not receiving any traffic intent data 314 and not receiving any traffic maneuver data 322. In block 640, the default trajectory prediction process 638 includes extrapolating one or more traffic state vectors 604 of the processed traffic track 320 to generate the traffic predicted trajectory 110. In accordance with an example, determining the traffic predicted trajectory 110 includes performing a linear extrapolation of a traffic state vector 604 in response to traffic intent data 314 and traffic maneuver data 322 being unavailable.

Figure 7:
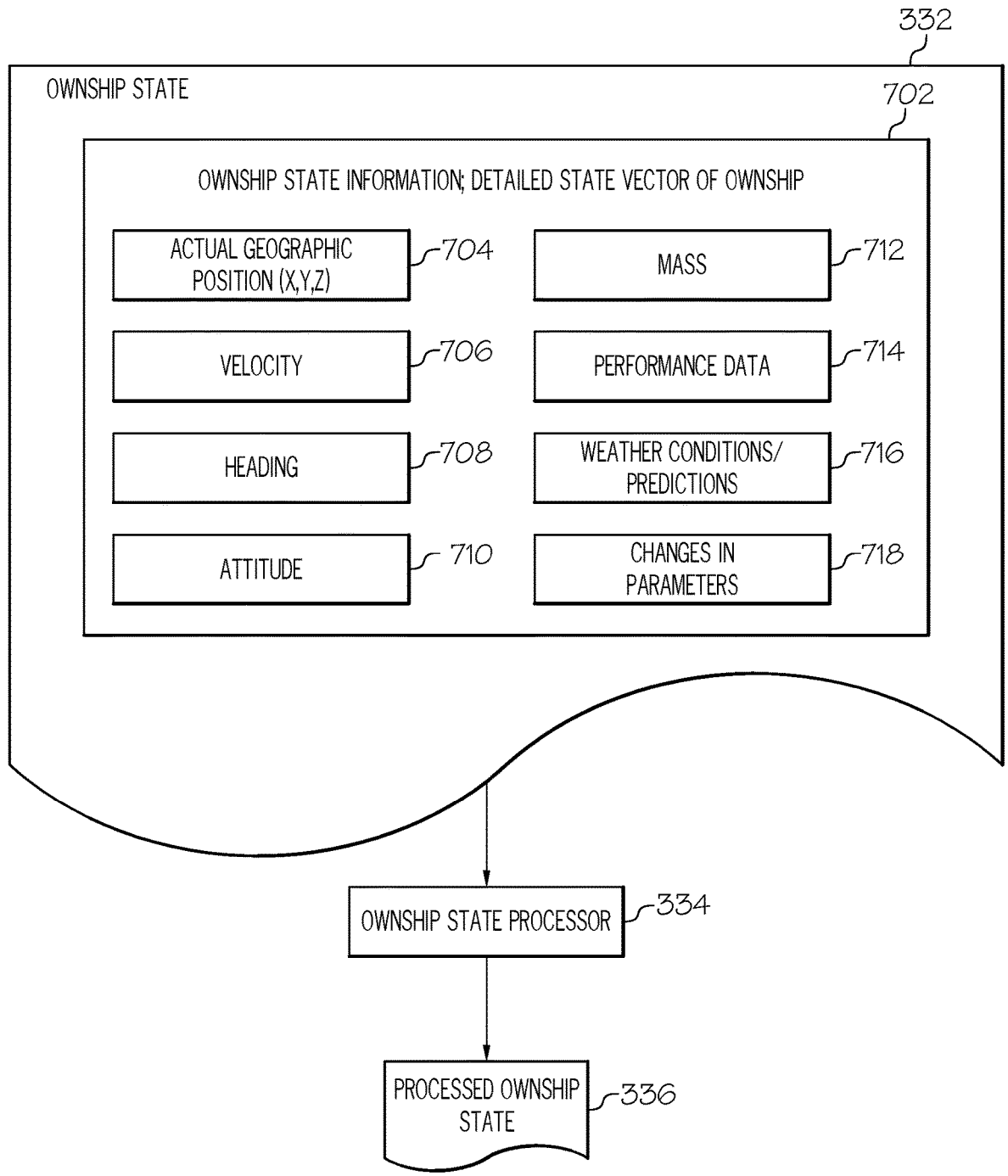
FIG. 7 is an example of an ownship state processor configured to generate a processed ownship state from an ownship state in accordance with an example of the present disclosure.

Referring back to FIG. 3, the ownship 300 includes a NAV module 330 configured for navigation of the ownship 300. The NAV module 330 is also configured to generate an ownship state 332. Referring also to FIG. 7, the ownship state 332 includes ownship state information 702. The ownship state 332 includes a detailed state vector of the ownship 300. Examples of the ownship state information include but are not necessarily limited to an actual geographic position 704 including altitude of the ownship 300; a velocity 706 of the ownship 300; a heading 708 of the ownship 300; an attitude 710 of the ownship 300; a mass 712 of ownship 300; performance data 714 of ownship 300; weather information 716 including current conditions and predictions; and changes in any of the preceding parameters 718.

The policy-based traffic encounter system 310 in FIG. 3 also includes an ownship state processor 334. The ownship state processor 334 is configured to generate a processed ownship state 336. Referring again to FIG. 7, FIG. 7 includes an example of the ownship state processor 334 configured to generate the processed ownship state 336 from an ownship state 332 in accordance with an example of the present disclosure.

Figure 8:
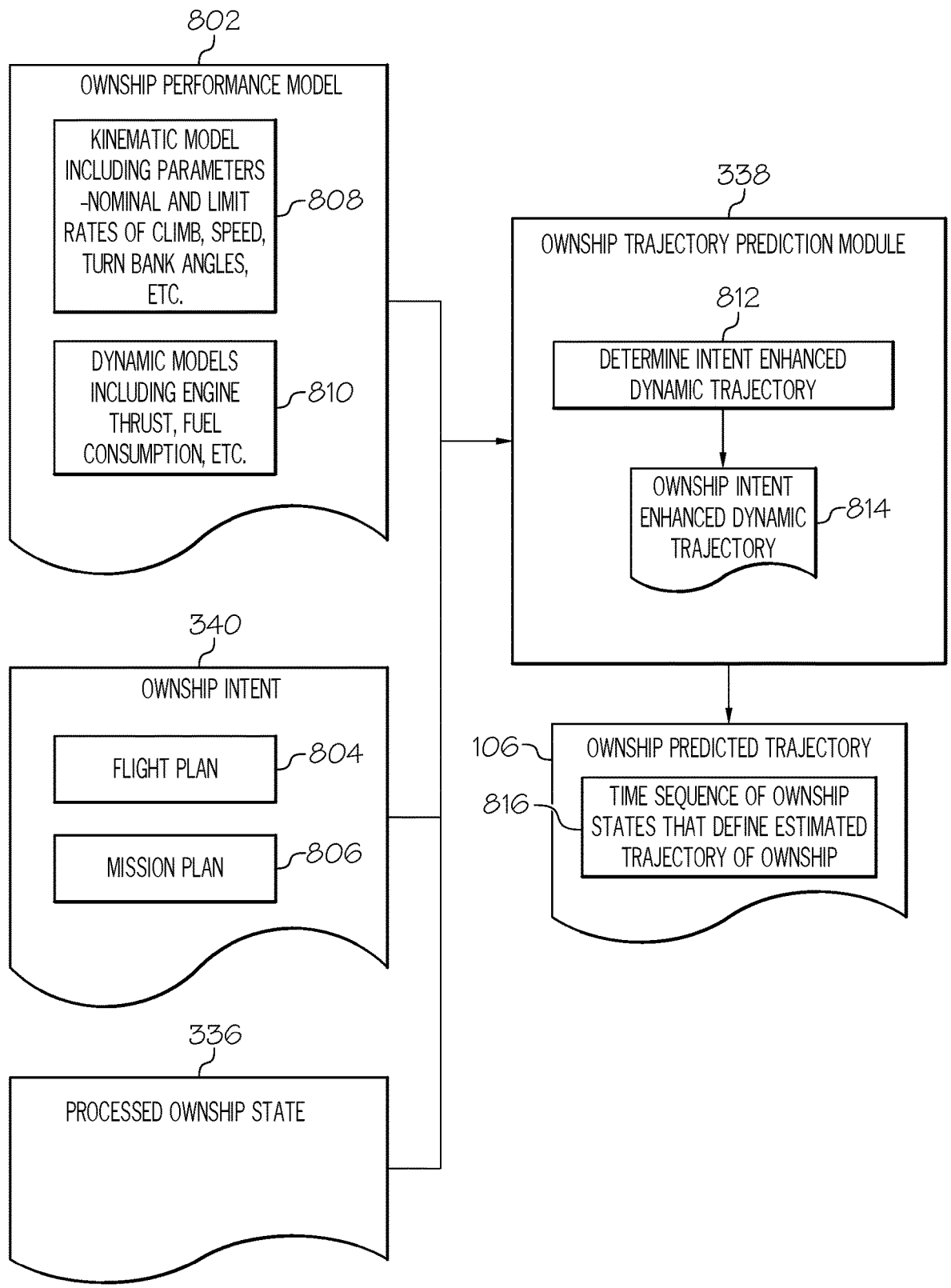
FIG. 8 is an example of an ownship trajectory prediction module configured to generate an ownship predicted trajectory in accordance with an example of the present disclosure.

Referring back to FIG. 3, the policy-based traffic encounter assessment system 310 also includes an ownship trajectory prediction module 338 configured to generate an ownship predicted trajectory 106 using at least an ownship intent 340 and the processed ownship state 336. In accordance with the example in FIG. 3, a flight control/flight management (FC/FM) computer 342 provides the ownship intent 340. Referring also to FIG. 8, FIG. 8 is an example of an ownship trajectory prediction module 338 configured to generate the ownship predicted trajectory 106 in accordance with an example of the present disclosure. In accordance with the example in FIG. 8, the ownship predicted trajectory 106 is determined by the ownship trajectory prediction module 338 using at least the processed ownship state 336, the ownship intent 340 and an ownship performance model 802. The ownship intent 340 includes detailed information on intent of the ownship 300. In the example in FIG. 8, detailed information on intent of the ownship 300 is determinable from at least one of a flight plan 804 and a mission plan 806 of the ownship 300.

In the example of FIG. 8, the ownship performance model 802 includes at least a kinematic model 808 and one or more dynamic models 810. The kinematic model 808 includes performance parameters of the ownship 300. Examples of the performance parameters include but are not limited to a nominal rate of climb, a rate of climb limit, speed limits, turn bank angles, etc. The one or more dynamic models include engine thrust, fuel consumption, etc.

In block 812, the ownship trajectory prediction module 338 is configured to determine an ownship intent enhanced dynamic trajectory 814 in response to the ownship intent 340 being provided to the ownship trajectory prediction module 338. The ownship intent enhanced dynamic trajectory 814 corresponds to the ownship predicted trajectory 106. In accordance with an example, the ownship predicted trajectory 106 includes a time sequence 816 of ownship states 332 (FIG. 3) that define an estimated trajectory of the ownship 300.

Figure 9A:
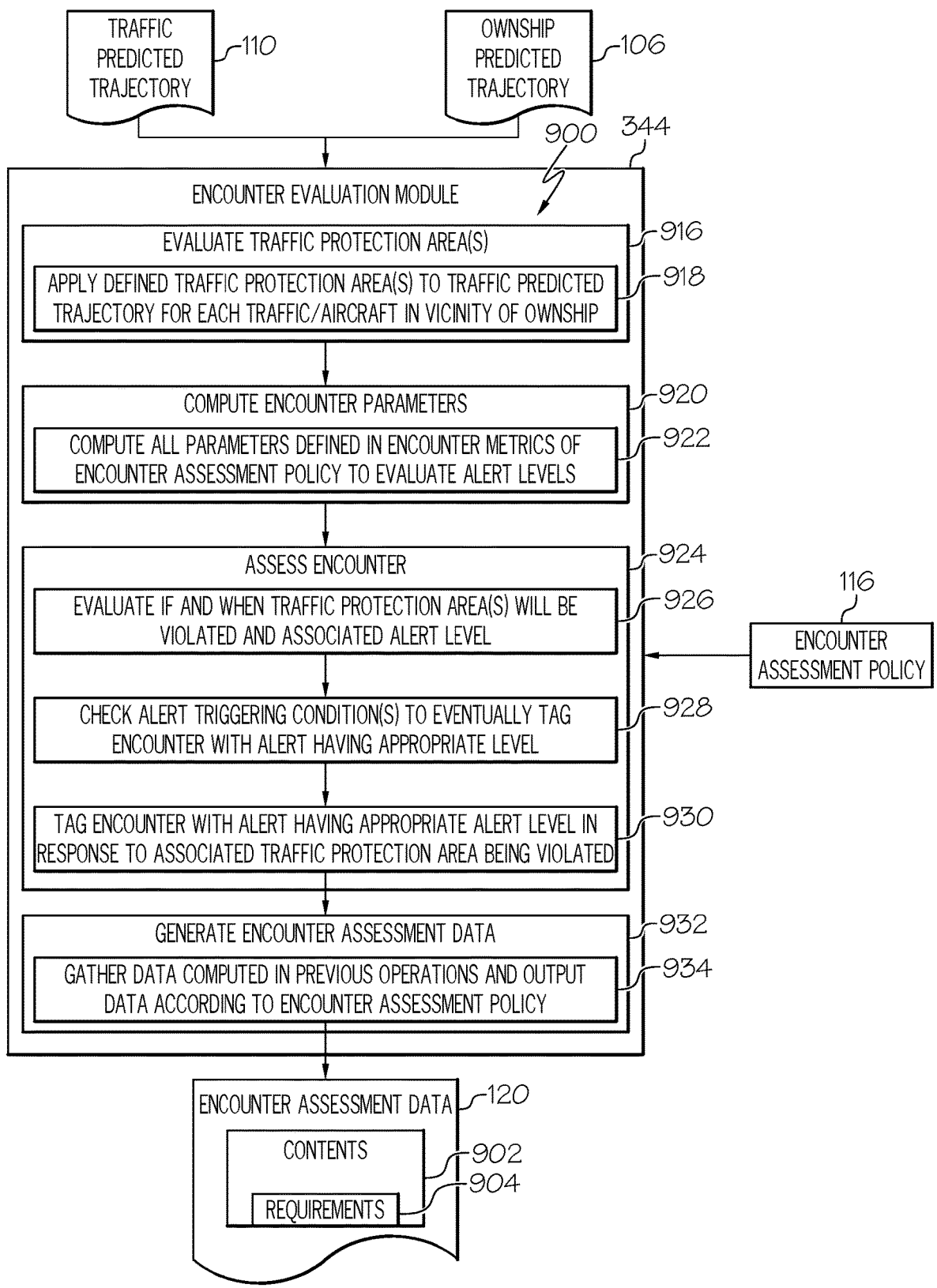
FIGS. 9A and 9B are an example of an encounter assessment module configured to generate encounter assessment data in accordance with an example of the present disclosure.
Figure 9B:
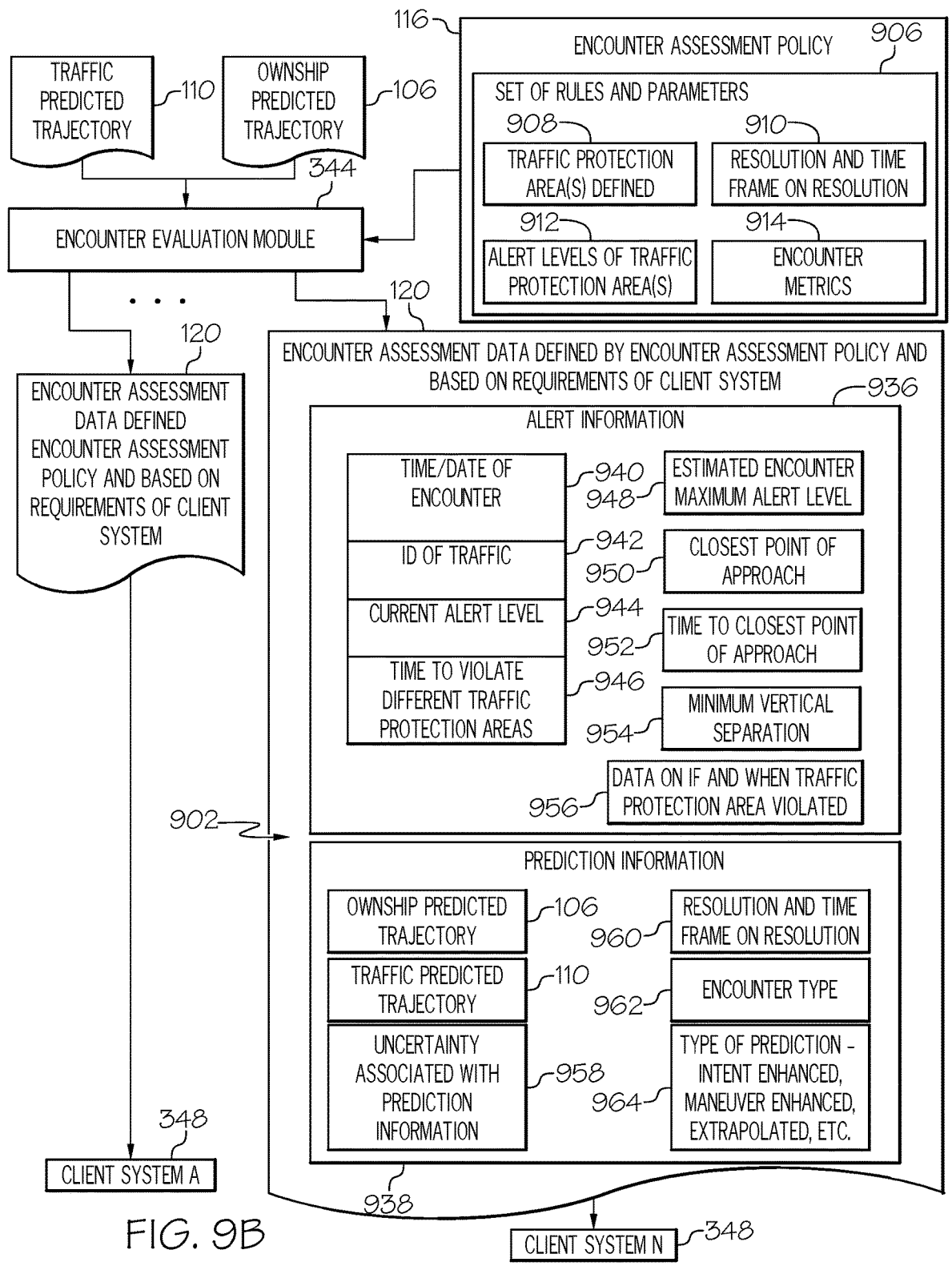

Referring back to FIG. 3, the policy-based traffic encounter assessment system 310 also includes an encounter evaluation module 344. The encounter evaluation module 344 is configured to generate the encounter assessment data 120 using at least the traffic predicted trajectory 110, the ownship predicted trajectory 106 and the encounter assessment policy 116. Referring also to FIGS. 9A and 9B, FIGS. 9A and 9B are an example of an encounter evaluation module 344 configured to generate encounter assessment data 120 in accordance with an example of the present disclosure. The encounter assessment data 120 is defined by the encounter assessment policy 116, and contents 902 of particular encounter assessment data 120 is based on one or more requirements 904 of a particular client system 348 (FIGS. 3 and 9B) that receives the particular encounter assessment data 120.

Referring to FIG. 9B, the encounter assessment policy 116 includes a set of rules and encounter parameters 906. The set of rules and encounter parameters 906 include one or more defined traffic protection areas 908. An example of a traffic protection area 1002 and 1102 associated with traffic 302 or another aircraft 304 is illustrated in FIGS. 10, 11A, 11B and 13. The set of rules and encounter parameters 906 also include resolution and time frame on resolution parameters 910. The set of rules and encounter parameters 906 additionally include alert level definitions 912 of traffic protection areas 908 and encounter metrics 914. An example of alert level definitions 912 will be described in more detail with reference to FIGS. 12 and 13.

Referring to FIG. 9A, FIG. 9A includes an example of a method 900 for assessing the encounter between the ownship 300 and the traffic 302 embodied in and performed by the encounter evaluation module 344.

Figure 10:
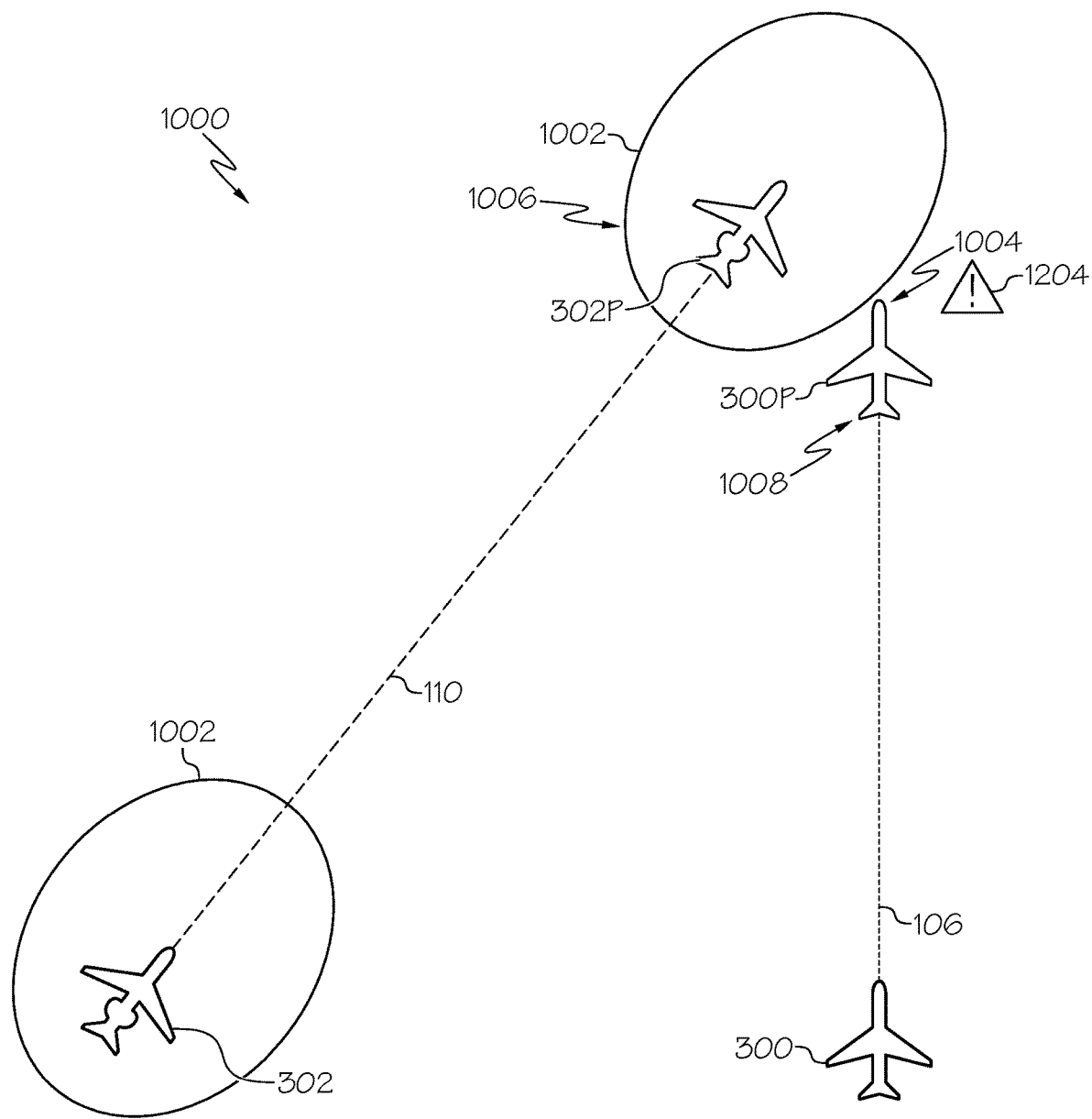
FIG. 10 is an exemplary representation of a geometric-defined traffic protection area in accordance with an example of the present disclosure.

In block 916, one or more traffic protection areas 1002 (FIG. 10) and 1102 (FIG. 11) are evaluated for each other aircraft 304 in the preset vicinity 306 of the ownship 300. The traffic protection areas 1002 and 1102 include geometric-defined traffic protection areas 1002 as illustrated in FIG. 10 and time-defined traffic protection areas 1102 as illustrated in FIG. 11. The example in FIG. 10 includes only the geometric-defined traffic protection area 1002. The example in FIG. 11 includes both a geometric-defined traffic protection area 1002 and a time-defined traffic protection area 1102.

In block 918, each traffic protection area 1002 in FIG. 10 or traffic protection area 1002 and 1102 in FIG. 11 is evaluated by applying a defined traffic protection area 908 to the traffic predicted trajectory 110 of each traffic 302 or aircraft 304 in the preset vicinity 306 of the ownship 300.

In block 920, encounter parameters 906 are computed. In block 922, all parameters 906 defined in the encounter metrics 914 (FIG. 9B) of the encounter assessment policy 116 are determined to evaluate alert levels 1206 (FIG. 12) for each traffic protection area 1002 in FIG. 10 or traffic protection areas 1002 and 1102 in FIG. 11. In accordance with an example, additional data is defined in the encounter assessment policy to better characterize the encounter 1004 (FIG. 10) and set an appropriate alert level 1206A-1206C. Examples of additional data include but are not limited to closest point of approach of the ownship 300 to the traffic 302; estimated time duration until violation of the traffic protection area 1002 by the ownship 300; minimum vertical separation between the ownship 300 and the traffic 302; simplified predictions of ownship trajectory and traffic trajectory, etc.

In block 924, an encounter 1004 (FIG. 10) between the ownship 300 and the traffic 302 is assessed. In block 926, assessing the encounter between the ownship 300 and the traffic 302 includes evaluating if and when each traffic protection area 1002 (FIG. 10) will be violated and an associated alert level 1206.

In block 928, assessing the encounter 1004 also includes checking an alert triggering condition 1202 for each time-defined traffic protection area 1102 to tag the encounter 1004 with an alert 1204 having an appropriate alert level 1206A-1206C. In block 930, assessing the encounter 1004 additionally includes tagging the encounter 1004 with the alert 1204 having the appropriate alert level 1206A-1206C in response to an associated traffic protection area 1102 being violated.

In block 932, the encounter assessment data 120 is generated in response to the encounter 1004 between the ownship 300 and the traffic 302. In accordance with the example in FIG. 9B, generating the encounter assessment data 120 includes generating alert information 936 and prediction information 938. As previously described, the encounter assessment data 120 is used to at least detect and avoid the traffic 302 by the ownship 300. In block 934, the encounter assessment data 120 is generated by gathering the data computed in blocks 916, 920 and 924 and outputting the encounter assessment data 120 according to the encounter assessment policy 116. As previously described, the particular encounter assessment data 120 transmitted to each particular client system 348 is defined by the encounter assessment policy 116 and is based on the requirements of the particular client system 348 that receives the particular encounter assessment data 120.

Referring to FIG. 9B, examples of the content 902 of the encounter assessment data include but is not necessarily limited to alert information 936 and prediction information 938. Examples of the alert information 936 include but are not limited to time and date of the encounter 940; identification of the traffic 942; current alert level 944; elapsed time to violate different traffic protection areas information 946; estimated encounter maximum alert level 948; closest point of approach 950; time to closet point of approach 952; minimum vertical separation 954; and data on if and when a particular traffic protection area 1002 or 1102 will be violated 956.

Examples of prediction information 938 include but are not limited to ownship predicted trajectory 106; traffic predicted trajectory 110; uncertainty associated with prediction information 958; resolution and time frame on resolution 960; encounter type 962; and type of prediction 964, e.g., intent enhanced, maneuver enhanced, extrapolated, etc.

FIG. 10 is an exemplary representation 1000 of a geometrically defined traffic protection area 1002 in accordance with an example of the present disclosure. In the example in FIG. 10, the traffic protection area 1002 is illustrated as an ellipse surrounding the traffic 302 although other geometric shapes may be used in other examples. The example in FIG. 10 is a two-dimensional (2D) representation and assumes the ownship 300 and traffic 302 are at the same altitude for purposes of illustration. In reality the traffic protection area 1002 will actual be a three-dimensional (3D) area including a vertical separation component not shown in FIG. 10.

A predicted position 1006 of the traffic 302P based on the traffic predicted trajectory 110 and a predicted position 1008 of the ownship 300P based on the ownship predicted trajectory 106 is illustrated in FIG. 10. Based on the traffic predicted trajectory 110 and the ownship predicted trajectory 106, the ownship 300P will encounter the geometric-defined traffic protection area 1002. As previously described, the method 900 for assessing the encounter 1004 between the ownship 300 and the traffic 302 will generate encounter assessment data 120 including an alert 1204 as illustrated in the example in FIG. 10.

Figure 11A:
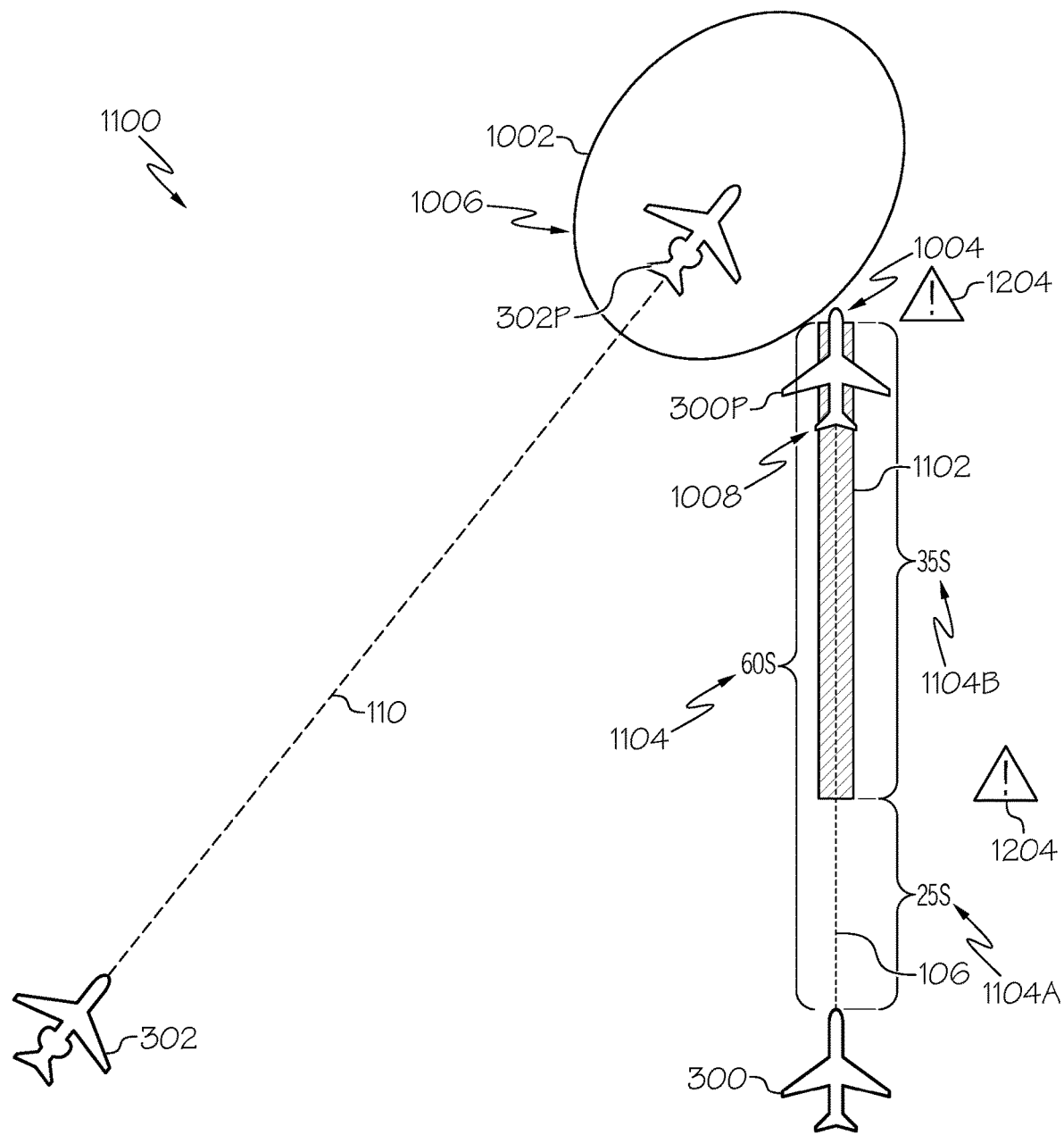
FIGS. 11A and 11B are each an exemplary representation of a geometric-based traffic protection area and time-based traffic protection area in accordance with an example of the present disclosure.
Figure 11B:
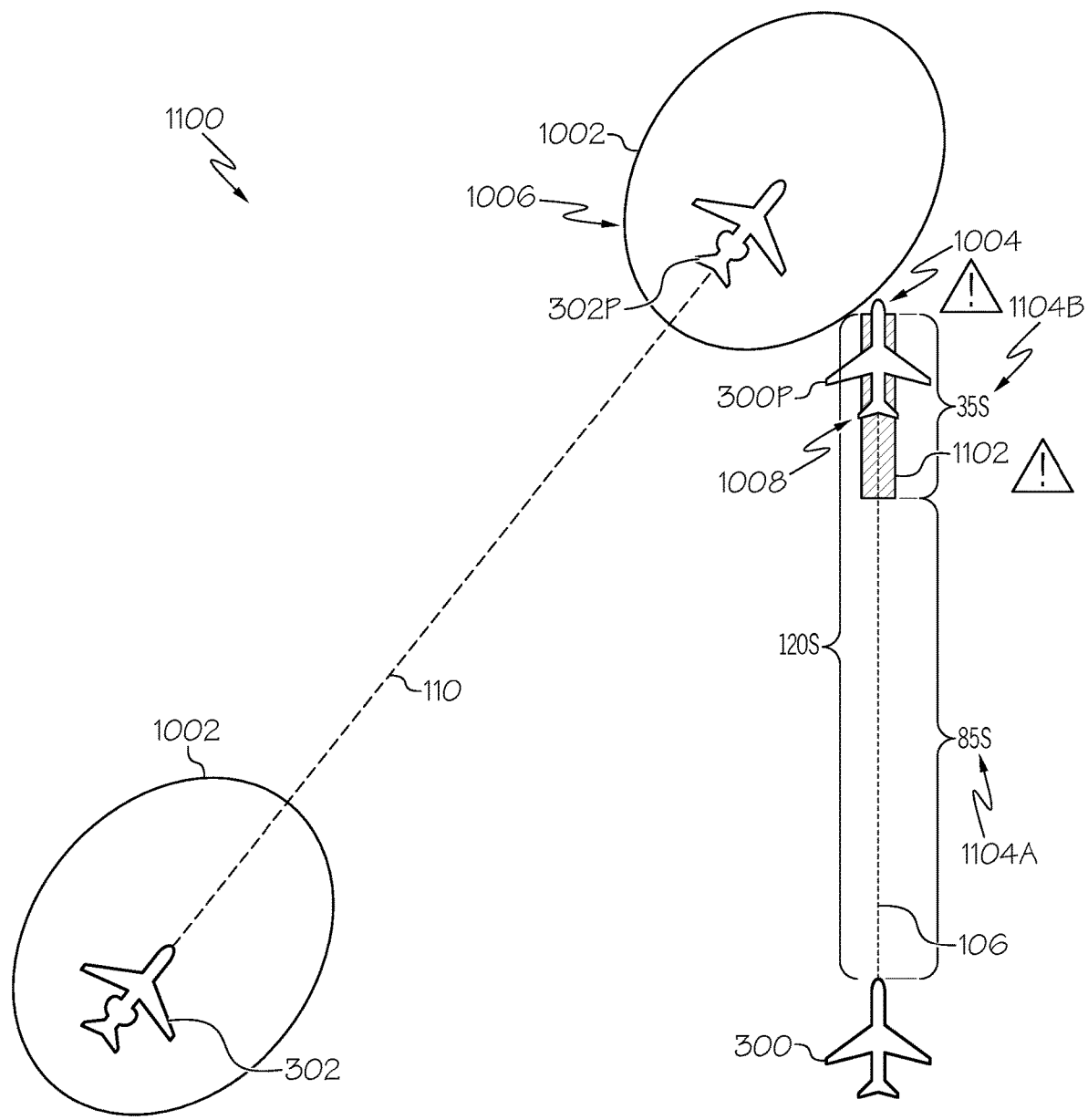

In accordance with another example, traffic protection areas are defined by means of time. FIGS. 11A and 11B are each an exemplary representation 1100 of a geometric-defined traffic protection area 1002 and time-defined traffic protection area 1102 in accordance with an example of the present disclosure. In the example in FIGS. 11A and 11B a time-defined traffic protection area 1102 is defined in combination with a geometric-defined traffic protection area 1002. The time-defined traffic protection area 1102 is defined based on a predicted time duration 1104 or group of predicted time durations 1104A and 1104B before the ownship 300 encounters the geometric-defined traffic protection area 1002 based on the ownship predicted trajectory 106 and the traffic predicted trajectory 110. In the example in FIG. 11A, the ownship 300 is predicted to encounter the geometric-defined traffic protection area 1002 in about 60 seconds (60 S) time. The ownship 300 is predicted to encounter the time-defined traffic protection area 1102 in about a 25 second (25 S) predicted time duration 1104A and to encounter the geometric-defined traffic protection area 1002 in about another 35 second (35 S) predicted time duration 1104B after encountering the time-defined traffic protection area 1102. While geometric-defined traffic protection areas 1002 are invariant, time-defined traffic protection areas 1102 depend on the relative speed of the traffic 302 and the ownship 300. In the example of FIG. 11B, a slower ownship 300 is illustrated. The geometric-defined traffic protection area 1002 is the same size. However, the time-defined traffic protection area 1102 is smaller in response to the slower speed of the ownship 300. Accordingly, a size of the time-defined traffic protection area 1102 will be dependent upon the speed of the ownship 300. The higher the speed of the ownship 300 the larger the size or length of the time-defined traffic protection area 1102. In the example in FIG. 11B, the ownship 300 is predicted to encounter the geometric-defined traffic protection area 1002 in about 120 seconds (120 S). The ownship 300 is predicted to encounter the time-defined traffic protection area 1102 in about an 85 second (85 S) predicted time duration 1104B and to encounter the geometric-defined traffic protection area 1002 in about a 35 second (35 S) predicted time duration 1104B after encountering the time-defined traffic protection area 1102.

Figure 12:
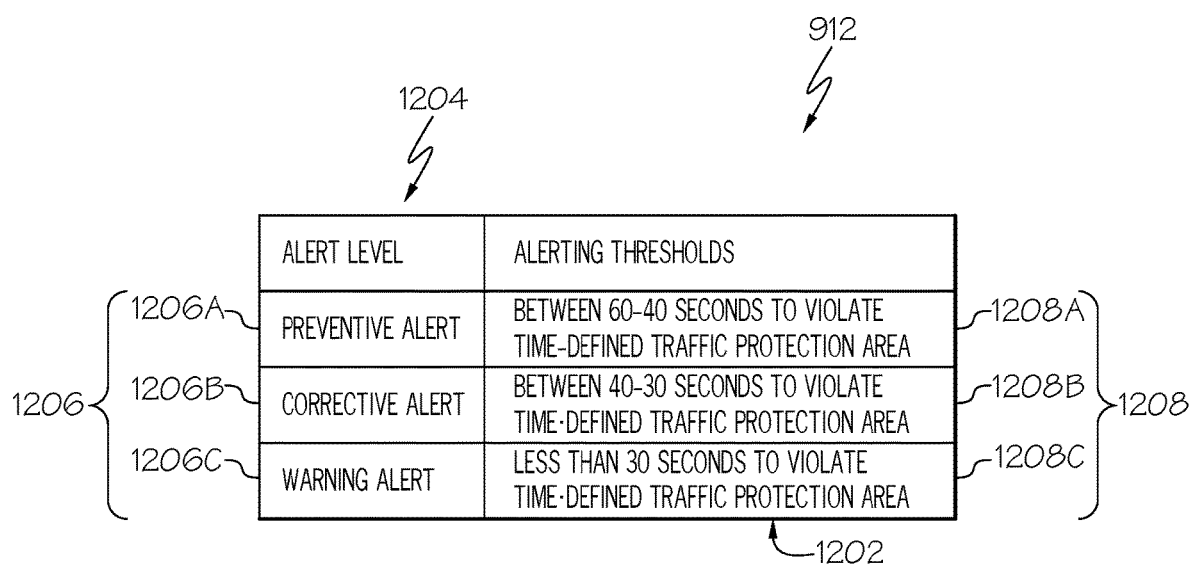
FIG. 12 is an example of alert level definitions in an encounter assessment policy in accordance with an example of the present disclosure.
Figure 13:
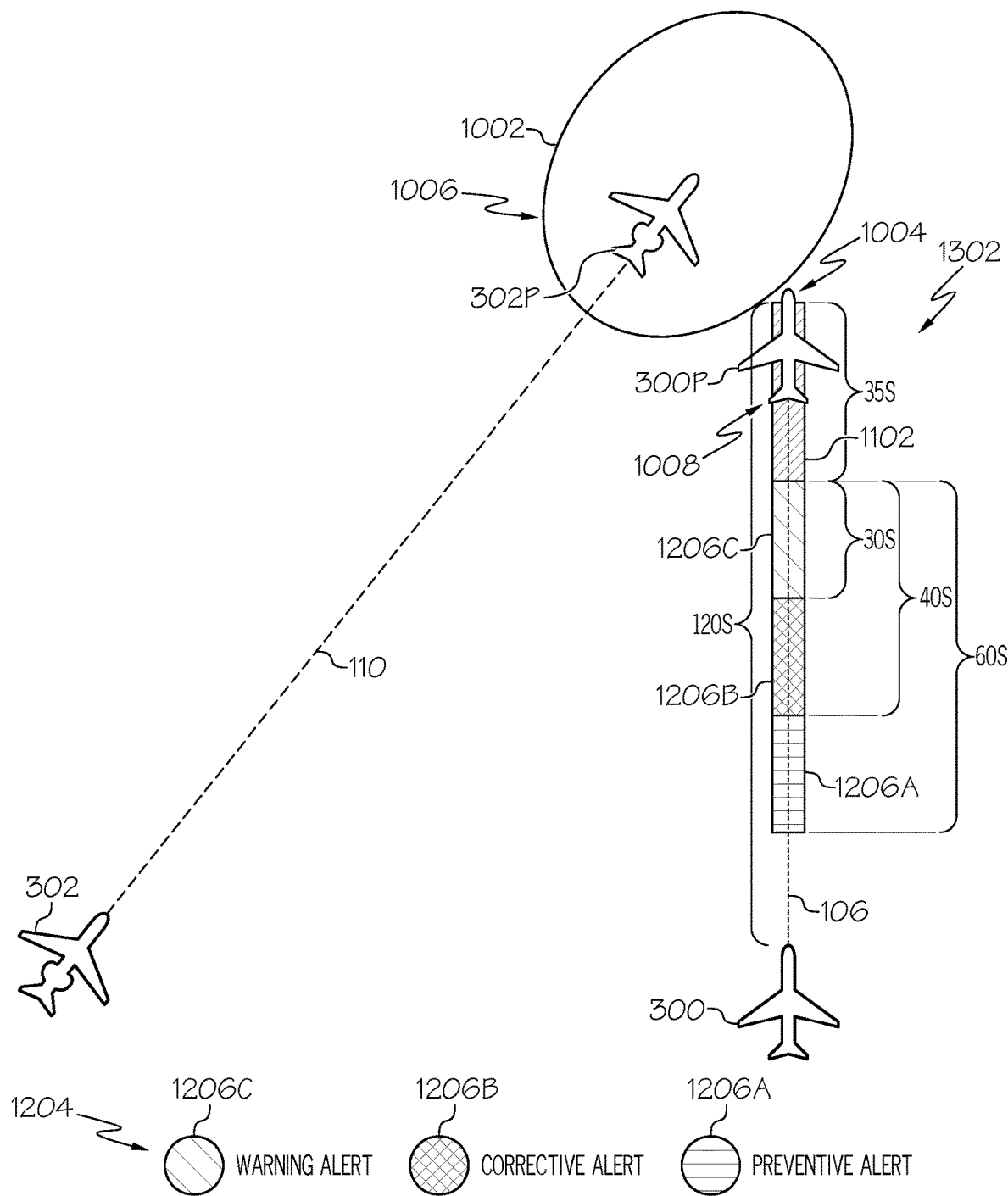
FIG. 13 is an exemplary representation of the alert levels in FIG. 12.

FIG. 12 is an example of alert level definitions 912 in an encounter assessment policy 116 in accordance with an example of the present disclosure. Alert levels 1206 indicate a severity of an encounter 1004. In the example in FIG. 12, the exemplary alert level definitions 912 include three alert levels: a preventive alert level 1206A, a corrective alert level 1206B, and a warning alert level 1206C. Other examples may have more or fewer alert levels. Each alert level 1206A-1206C includes a corresponding alerting threshold 1208A-1208C. Each alerting threshold 1208A-1208C defines a time range in seconds before the ownship 300 violates the time-defined traffic protection area 1102. Referring also to FIG. 13, FIG. 13 is an exemplary representation 1302 of the alert levels 1206A-1206C in FIG. 12. In accordance with the example in FIGS. 12 and 13, the preventive alert level 1206A has an alerting threshold 1208A of between 60-40 seconds (60 S-40 S) before the ownship 300 violates the time-defined traffic protection area 1102 based on the traffic predicted trajectory 110 and the ownship predicted trajectory 106. The corrective alert 1206B has an alerting threshold 1208B of between 40-30 seconds (40 S-30 S) before the ownship 300 violates the time-defined traffic protection area 1102, and the warning alert level 1206C has an alerting threshold 1208C of less than 30 seconds (30 S) before the ownship 300 violates the time-defined traffic protection area 1102 based on the traffic predicted trajectory 110 and the ownship predicted trajectory 106. These alert levels 1206A-1206C are used to detect and avoid traffic 302 by the ownship 300. In accordance with an example the alert levels 1206A-1206C are presented to an operator or pilot of the ownship 300.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular examples only and is not intended to be limiting of examples of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present examples has been presented for purposes of illustration and description, but is not intended to be exhaustive or limited to examples in the form disclosed. Many modifications and variations will be apparent to those of ordinary skill in the art without departing from the scope and spirit of examples.

Although specific examples have been illustrated and described herein, those of ordinary skill in the art appreciate that any arrangement which is calculated to achieve the same purpose may be substituted for the specific examples shown and that the examples have other applications in other environments. This application is intended to cover any adaptations or variations. The following claims are in no way intended to limit the scope of examples of the disclosure to the specific examples described herein.

What is claimed is:

1. A method for policy-based traffic encounter assessment to detect and avoid traffic, the method comprising:
   determining, by a processor, an ownship predicted trajectory of an aircraft, the aircraft being the ownship;
   determining a traffic predicted trajectory of one or more other aircraft in a vicinity of the ownship, the one or more other aircraft comprising traffic;
   assessing an encounter between the ownship and the traffic, wherein assessing the encounter between the ownship and the traffic comprises applying an encounter assessment policy to the traffic predicted trajectory and the ownship predicted trajectory, wherein assessing the encounter between the ownship and traffic further comprises:
      applying a traffic protection area to the traffic predicted trajectory of each other aircraft in the vicinity of the ownship, and wherein the traffic protection area comprises a time-defined traffic protection area in combination with a geometric-defined traffic protection area, the time-defined traffic protection area is defined based on a predicted time duration or a group of time durations before the ownship encounters the geometric-defined traffic protection area based on the ownship predicted trajectory and the traffic predicted trajectory; and evaluating a plurality of alert levels for each traffic protection area, wherein each alert level comprises a corresponding alerting threshold and each alerting threshold defines a reduced time range before the ownship violates the time-defined traffic protection area; and generating encounter assessment data in response to assessing the encounter between the ownship and the traffic; and detecting and avoiding the traffic by the ownship, wherein the encounter assessment data is used to at least detect and avoid the traffic by the ownship.

2. The method of claim 1, wherein determining the traffic predicted trajectory comprises predicting a trajectory of the traffic as a sequence of timely ordered predicted traffic state vectors.

3. The method of claim 1, wherein determining the traffic predicted trajectory comprises using a processed traffic track and any available enhancement by a traffic trajectory prediction module to generate the traffic predicted trajectory.

4. The method of claim 3, further comprising generating the processed traffic track by a traffic track processor from traffic track data, wherein the traffic track processor is configured to determine a relative position between the ownship and the traffic and to analyze a history of a plurality of traffic tracks to determine maneuvering patterns of the traffic and wherein traffic maneuver data is generated by the traffic track processor from the maneuvering patterns of the traffic.

5. The method of claim 4, further comprising generating the traffic track data and any traffic intent data by a traffic detection module using at least one of traffic state information, Automatic Dependent Surveillance Broadcast (ADS-B) reports, Traffic Information Service Broadcast (TIS-B) reports, shared flight plans of the traffic and ownship, and a mission description of the traffic.

6. The method of claim 1, wherein determining the traffic predicted trajectory comprises determining any enhancement to the traffic predicted trajectory for application to the traffic predicted trajectory.

7. The method of claim 6, wherein determining the traffic predicted trajectory comprises determining the traffic predicted trajectory enhanced by traffic intent data.

8. The method of claim 7, further comprising translating the traffic intent data into constraints that are met during a traffic trajectory prediction process.

9. The method of claim 8, further comprising determining the traffic intent data by a traffic detection module using at least one of traffic state information, Automatic Dependent Surveillance Broadcast (ADS-B) reports, Traffic Information Service Broadcast (TIS-B) reports, shared flight plans of the traffic and ownship, and a mission description of the traffic.

10. The method of claim 6, wherein determining the traffic predicted trajectory comprises determining the traffic predicted trajectory enhanced by traffic maneuver data.

11. The method of claim 10, wherein determining the traffic predicted trajectory enhanced by traffic maneuver data comprises predicting a collision course traffic trajectory using a processed traffic track, an ownship predicted trajectory and the traffic maneuver data.

12. The method of claim 1, wherein the encounter assessment data is defined by the encounter assessment policy, and contents of particular encounter assessment data is based on one or more requirements of a client system that receives the particular encounter assessment data.

13. The method of claim 1, wherein determining the ownship predicted trajectory comprises using an ownship state, an ownship intent and an ownship performance model.

14. The method of claim 1, wherein assessing the encounter between the ownship and the traffic further comprises:
evaluating the traffic protection area for each other aircraft in the vicinity of the ownship by applying a defined traffic protection area to the traffic predicted trajectory of each other aircraft in the vicinity of the ownship;
computing encounter parameters defined in encounter metrics of the encounter assessment policy to evaluate the plurality of alert levels for each traffic protection area;
evaluating if and when each traffic protection area will be violated and an associated alert level;
checking an alert triggering condition for each traffic protection area to tag the encounter with an alert having an appropriate alert level; and
tagging the encounter with the alert having the appropriate alert level in response to an associated traffic protection area being violated.

15. The method of claim 1, wherein determining the traffic predicted trajectory comprises performing a linear extrapolation of a traffic state vector in response to traffic intent data and traffic maneuver data being unavailable.

16. The method of claim 1, wherein generating the encounter assessment data comprises generating alert information and prediction information.

17. A system for policy-based traffic encounter assessment to detect and avoid traffic, the system comprising:
a processor; and
a memory associated with the processor, the memory comprising computer-readable program instructions that, when executed by the processor causes the processor to perform a set of functions comprising:
determining an ownship predicted trajectory of an aircraft, the aircraft being the ownship;
determining a traffic predicted trajectory of one or more other aircraft in a vicinity of the ownship, the one or more other aircraft comprising traffic;
assessing an encounter between the ownship and the traffic, wherein assessing the encounter between the ownship and the traffic comprises applying an encounter assessment policy to the traffic predicted trajectory and the ownship predicted trajectory, wherein assessing the encounter between the ownship and traffic further comprises:
applying a traffic protection area to the traffic predicted trajectory of each other aircraft in the vicinity of the ownship, and wherein the traffic protection area comprises a time-defined traffic protection area in combination with a geometric-defined traffic protection area, the time-defined traffic protection area is defined based on a predicted time duration or a group of time durations before the ownship encounters the geometric-defined traffic protection area based on the ownship predicted trajectory and the traffic predicted trajectory;
evaluating a plurality of alert levels for each traffic protection area, wherein each alert level comprises a corresponding alerting threshold and each alerting threshold defines a reduced time range before the ownship violates the time-defined traffic protection area; and generating encounter assessment data in response to assessing the encounter between the ownship and the traffic; and detecting and avoiding the traffic by the ownship, wherein the encounter assessment data is used to at least detect and avoid the traffic by the ownship.

18. The system of claim 17, wherein assessing the encounter between the ownship and the traffic further comprises:

evaluating the traffic protection area for each other aircraft in the vicinity of the ownship by applying a defined traffic protection area to the traffic predicted trajectory of each other aircraft in the vicinity of the ownship;

computing encounter parameters defined in encounter metrics of the encounter assessment policy to evaluate the plurality of alert levels for each traffic protection area;

evaluating if and when each traffic protection area will be violated and an associated alert level;

checking an alert triggering condition for each traffic protection area to tag the encounter with an alert having an appropriate alert level; and tagging the encounter with the alert having the appropriate alert level in response to an associated traffic protection area being violated.

19. An aircraft comprising:

a system for policy-based traffic encounter assessment to detect and avoid traffic, the system comprising:

a processor; and a memory associated with the processor, the memory comprising computer-readable program instructions that, when executed by the processor causes the processor to perform a set of functions comprising:

determining an ownship predicted trajectory of the aircraft, the aircraft being the ownship;

determining a traffic predicted trajectory of one or more other aircraft in a vicinity of the ownship, the one or more other aircraft comprising traffic;

assessing an encounter between the ownship and the traffic, wherein assessing the encounter between the ownship and the traffic comprises applying an encounter assessment policy to the traffic predicted trajectory and the ownship predicted trajectory, wherein assessing the encounter between the ownship and traffic further comprises:

applying a traffic protection area to the traffic predicted trajectory of each other aircraft in the vicinity of the ownship, and wherein the traffic protection area comprises a time-defined traffic protection area in combination with a geometric-defined traffic protection area, the time-defined traffic protection area is defined based on a predicted time duration or a group of time durations before the ownship encounters the geometric-defined traffic protection area based on the ownship predicted trajectory and the traffic predicted trajectory;

evaluating a plurality of alert levels for each traffic protection area, wherein each alert level comprises a corresponding alerting threshold and each alerting threshold defines a reduced time range before the ownship violates the time-defined traffic protection area; and generating encounter assessment data in response to assessing the encounter between the ownship and the traffic; and detecting and avoiding the traffic by the ownship, wherein the encounter assessment data is used to at least detect and avoid the traffic by the ownship.

20. The aircraft of claim 19, wherein assessing the encounter between the ownship and the traffic further comprises:

evaluating a traffic protection area for each other aircraft in the vicinity of the ownship by applying a defined traffic protection area to the traffic predicted trajectory of each other aircraft in the vicinity of the ownship;

computing encounter parameters defined in encounter metrics of the encounter assessment policy to evaluate the plurality of alert levels for each traffic protection area;

evaluating if and when each traffic protection area will be violated and an associated alert level;

checking an alert triggering condition for each traffic protection area to tag the encounter with an alert having an appropriate alert level; and tagging the encounter with the alert having the appropriate alert level in response to an associated traffic protection area being violated.

* * * * *